July 8, 1941.  H. R. HUGHES ET AL  2,248,351
CHECKING SYSTEM FOR AIRCRAFT
Filed June 14, 1939  3 Sheets-Sheet 2
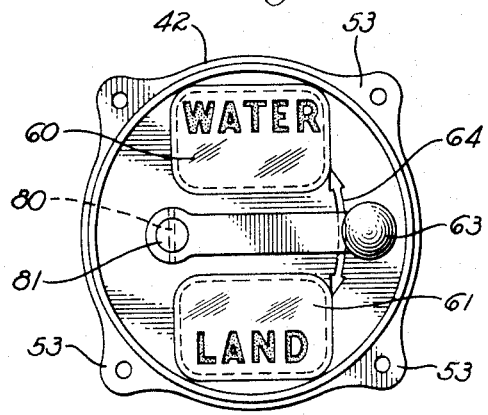
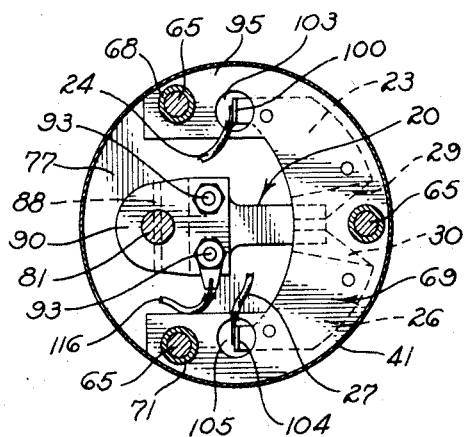
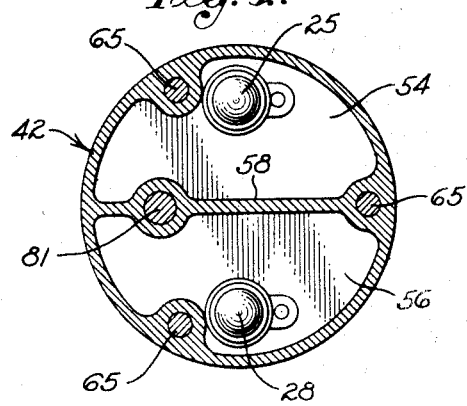
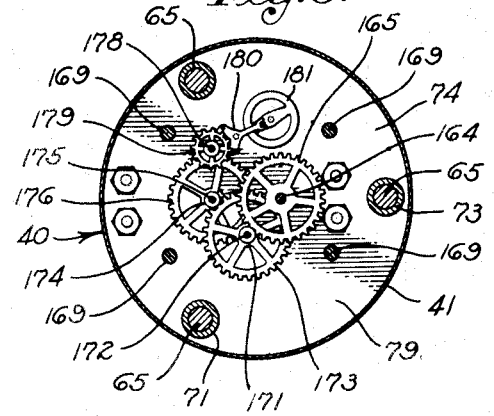
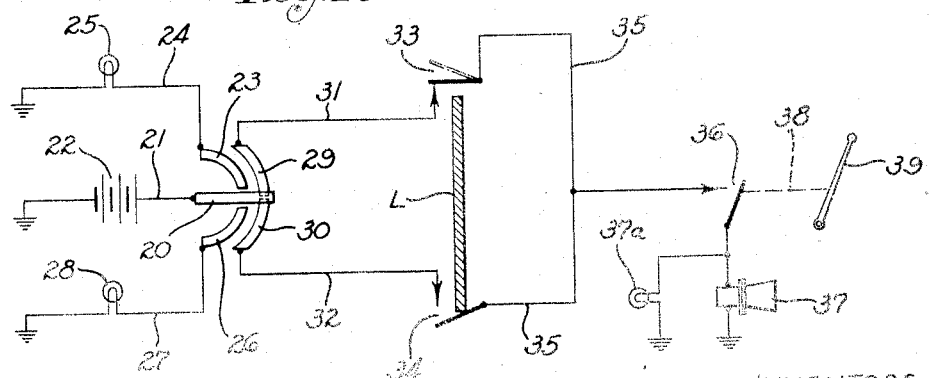
INVENTORS
HOWARD R. HUGHES
STANLEY A. BELL
BY HARRIS, KIECH, FOSTER & HARRIS
FOR THE FIRM
ATTORNEYS INVENTORS
HOWARD R. HUGHES
STANLEY A. BELL
BY HARRIS, KIECH, FOSTER & HARRIS
FOR THE FIRM
ATTORNEYS

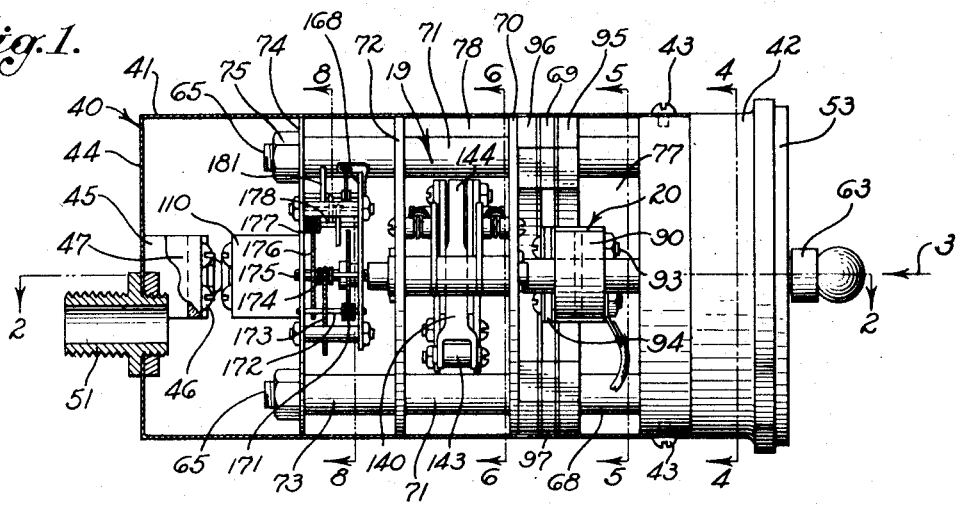

UNITED STATES PATENT OFFICE 2,248,351

CHECKING SYSTEM FOR AIRCRAFT

Howard R. Hughes, Houston, Tex., and Stanley A. Bell, Glendale, Calif., assignors to Hughes Tool Company, Houston, Tex., a corporation of Delaware Application June 14, 1939, Serial No. 279,124

4 Claims. (Cl. 177—311)

Our invention relates to aircraft with special reference to aids for aircraft operators, and is directed to a system for checking the disposition of important aircraft devices or members for given operating situations.

The numerous devices including instruments, auxiliary control members, and accessories on a modern aircraft make heavy demands on a pilot and often tend to monopolize his attention at times when he should be free to concentrate on maneuvering the ship. Even when his attention is not diverted to observe or manipulate such devices, his mind must continually revert to his responsibility for keeping the various devices disposed in accord with changing operating conditions. The serious aspect of such dispersal of attention is that the harried pilot may overlook one or two adjustments or manipulations that are of utmost importance or absolutely essential for a given operating condition. For example, of the numerous devices on an aircraft to be observed or adjusted prior to takeoff, two devices essential for safety might be retractable wing flaps for increasing lift and a valve controllable for temporarily drawing upon an auxiliary supply of high-octane fuel. There is a distinct need for some means to reduce this burden on the pilot, at least to the extent of warning the pilot when such requisite dispositions are not made to meet given operating situations.

The necessity for directing the pilot's attention to imperative adjustments of aircraft devices or members is pressing in making landings, especially emergency landings, and more especially if the particular aircraft is an amphibian having retractable landing gears or retractable wing floats. At such a time the provision of some efficient means for rapidly checking the dispositions of paramount members and devices preparatory for landing would permit the pilot to concentrate with unhampered mind on his task of appraising his flight problem, making sound decisions, and maneuvering his ship to the ground.

The general object of our invention is to meet the above expressed need for some efficient and expeditious means for checking factors that are vital in a given operating situation. We propose to reduce the checking task of the pilot to a simple checking movement or manipulation that will be immediately followed by some suitable warning signal if the selected devices or members of the aircraft are not properly disposed for the operating situation confronting the pilot.

More specifically, it is our object to provide a checking system in which a signal means is operatively related both to a manually movable checking member and to one or more essential devices or members of the aircraft in such a manner that when the checking member is manipulated to represent a given operating situation, a warning signal will follow automatically if said essential devices or members are not disposed as required by the given operating situation.

It is encumbent, of course, upon the pilot to manipulate the checking member to make the checking system effective whenever he is confronted with the given operating situation, and in some practices of our invention the pilot must train himself to turn to the checking system by habit whenever the given operating situation arises. In one form of our invention, however, the checking system is operatively related to some aircraft means that is responsive to changing operating conditions or is responsive to some control movement or adjustment on the part of the pilot that reflects or characterizes the given operating situation. The important feature of such an arrangement of our invention is that the system may thus be designed to function largely in an automatic manner to warn the pilot to make the required checking manipulation whenever the given operating situation arises or is in prospect.

Another object of our invention is to provide a checking system of the character described that is operable by a pilot and is combined with an indicating means responsive thereto for the attention of a co-pilot.

One important feature of our invention arises from the fact that the checking system may be arranged to respond directly to the essential members or devices to be checked whereby failure of such devices or members to respond to the pilot's control means will be promptly revealed to the pilot. For example, failure of landing gear mechanism to function will not escape notice.

Further objects in mind are to make such a checking system serve more than one operating situation when desirable, and to make such a system respond to as many devices or members of the aircraft as may be considered vital in each operating situation.

The above and other features and objects of our invention will be apparent from the detailed description to follow, taken with the accompanying drawings.

In the drawings:

Fig. 1 is a side elevation partly in section of an apparatus that may be employed in our checking system;

Fig. 2 is a longitudinal section taken as indicated by the line 2—2 of Fig. 1;

Fig. 3 is an end elevation taken as indicated by the arrow 3 of Fig. 1;

Fig. 4 is a section taken as indicated by the line 4—4 of Fig. 1;

Fig. 5 is a section taken as indicated by the line 5—5 of Fig. 1;

Fig. 6 is a section taken as indicated by the line 6—6 of Fig. 1;

Fig. 7 is a view similar to Fig. 6 showing the mechanism in a second position;

Fig. 8 is a transverse section taken as indicated by the line 8—8 of Fig. 1;

Fig. 9 is a section through the casing of Fig. 6 taken as indicated by the broken line 9—9 to reveal a portion of the mechanism in top elevation;

Fig. 10 is a diagrammatic representation of one form of our system adapted to check the disposition of a single member or device of the aircraft;

Figure 11:
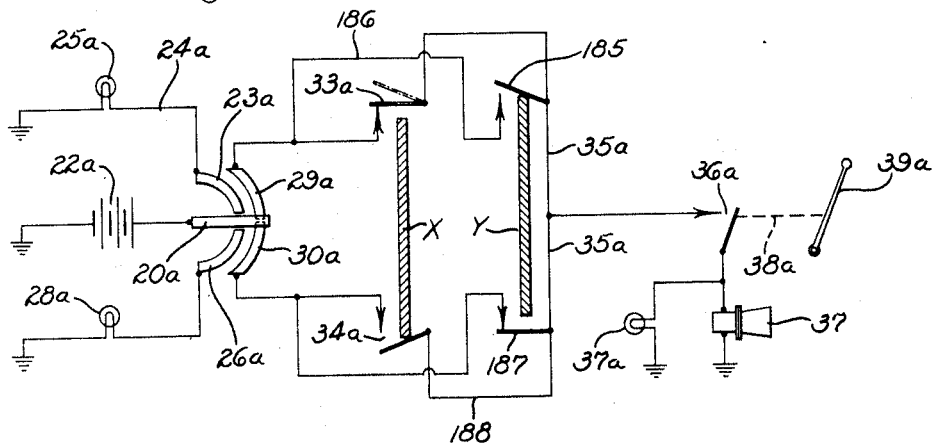
Fig. 11 is a similar diagrammatic representation of our system as adapted to check a plurality of devices or members of an aircraft.

An understanding of our basic concept of a checking system may be approached by first considering the diagrammatic representation in Fig. 10. A switch arm 20 normally having the neutral position shown is operatively connected with some indicating member to move therewith. The switch arm 20 is connected by a wire 21 with a grounded battery 22. Spaced to one side of the neutral position of the switch 20 is a contact 23 connected by a wire 24 to a grounded lamp 25; and spaced from the switch arm on the opposite side is a similar contact 26 connected by a wire 27 to a second grounded lamp 28.

In its neutral position the switch arm 20 overlaps and touches two contacts 29 and 30 that are connected respectively by wires 31 and 32 to switches generally designated 33 and 34. The switches 33 and 34 are connected in parallel through wires 35 with a switch generally designated 36, the switch 36 being in turn connected with a horn 37 or other suitable signal means that is grounded, as shown, to complete the circuit back to the battery 22. A red lamp 37a may be placed in parallel with the horn 37 to be controlled simultaneously therewith, the red lamp being visible to the pilot as a warning indicator to keep the pilot from being misled by failure of the horn. The switch 36 is operatively connected as indicated by the dotted line 38 with the throttle lever 39 of the aircraft.

The purpose of the system shown in Fig. 10 is to check the disposition of a retractable landing gear on an amphibian airplane. The two switches 33 and 34, therefore, are adapted to respond mechanically to a member L that is either one of the normal working parts of the landing gear mechanism or is operatively connected to such mechanism to be moved to a lower position when the landing gear is extended for land use and to an upper position when the landing gear is retracted for normal flight or for landing on water. At the lower position the member L permits the switch 33 to close but holds the switch 34 open, and at its upper position it permits the switch 34 to close but holds the switch 33 open, both switches being constructed automatically to take closed positions when not acted upon by the member L.

The principle of operation may be readily understood from Fig. 10. It is intended that the switch arm 20 will normally be in its neutral position spaced from the contacts 23 and 26, but touching both the contacts 29 and 30. Normally the circuit through the warning horn 37 and lamp 37a will be open because the switch 36 will normally be held open by the throttle 39. When the pilot prepares to make a landing, however, he will shift the throttle 39 to its cut-off or idling position, thereby closing the switch 36, whereupon the warning horn 37 and lamp 37a will be energized, since one of the two switches 33 and 34 will be closed to complete the circuit through the switch arm 20. The warning signal resulting from closing the circuit through the horn 37 and lamp 27a will remind the pilot to check the disposition of the landing gear. He thereupon will swing the switch arm 20 downward if he is to land on ground, or upward if he is to land on water. In the full line position of the member L in Fig. 10 the member is holding the switch 34 open, thereby signifying that the landing gear is extended for landing on ground. Swinging the lever 20 downward, then, to light the lamp 28 that indicates "Land" will cause the warning horn to be de-energized since the switch arm in its downward position is spaced from the contact 29 and since the contact 30 is cut off from the horn by the switch 34.

If the landing is to be made on water, the operator will swing the arm 20 upward to energize the lamp 25 that indicates "Water," but the warning signal will continue without interruption because the switch 33 is closed. To terminate the warning signals, the pilot must retract his landing mechanism, whereupon the member L moving upwardly will open the switch 33.

The situation of maneuvering to a landing is the given operating situation for which the system shown in Fig. 10 is designed, and it will be readily apparent to those skilled in the art how such a checking system may be adapted to cope with other operating situations. It is to be noted that since the normal position of the throttle 39 for landing is the cut-off or idling position, such position of the throttle characterizes the given operating situation and distinguishes that operating situation from at least most other operating situations. By making the system responsive to movement of the throttle to this throttle position characterizing the given operating situation, we, in effect, make our system responsive to the given operating situation and thereby provide for automatically warning the pilot when the system should be manipulated to check whatever devices are of utmost importance in the given operating situation. Instead of operatively relating the system to the cut-out throttle, we may operatively relate the system to any means or mechanism on the aircraft that characterizes the given operating situation. Thus, for example, it will be readily apparent that the system may be responsive to a centrifugal switch that closes when the engine slows down, just as the switch 36 closes to slow down the engine.

In the system constructed as above described, failure of the warning signal means to be energized when the throttle is closed down will mean that the switch arm 20 is displaced upward or downward from its normal neutral position. One of these positions precluding a horn signal might, however, represent the wrong disposition of the landing gear. For example, if the switch arm 20 were in its lower position when the operator closes down the throttle to land on water, the horn 37 would not be energized to warn the pilot. It is true that in such a situation the lamp 28 designating "Land" would be energized and to that extent serve warning that the landing gear is not properly disposed for landing on water. We prefer, however, not to depend solely on one of the indicating lamps in such a situation and for this reason, among others, we prefer to incorporate in such a system delayed action means to return the switch arm 20 automatically to its neutral position whenever it is shifted in either direction from that position, the return movement being completed in a desirably extended time interval. By virtue of this provision, we insure the switch arm 20 being in the neutral position whenever a landing is to be made and, incidentally, we avoid unnecessarily prolonged energization of either lamp 25 or lamp 28.

The embodiment of such a system in a suitable physical structure is within the skill of those conversant with the art. At least no further description is necessary of the two switches 33 and 34, the switch 36, the warning horn 37, and the lamp 37a. The following detailed description, however, will be helpful in suggesting how the electrical elements associated with the switch arm 20 and the delayed-action means for moving the switch arm may be provided in a compact arrangement at or near the instrument board of an aircraft.

Preferably the manually operable switch arm 20, the associated contacts, the lamps 25 and 28, and the delayed-action means for operating said switch arm are all housed in a casing that fronts on the instrument board of the aircraft. Such a casing 40 as shown in Figs. 1 and 2 may comprise a cylindrical shell 41 removably mounted on a head member 42 and secured thereon by suitable screws 43.

The shell 41 has an end wall 44, to the inner face of which a bracket 45 of insulating material is mounted by suitable screws 46. The bracket 45 carries three inwardly directed electrical plugs 47, 48, and 49 connected respectively to wires 21, 31, and 32, each of the plugs having a nut 50 to engage the corresponding wire. Preferably the end wall 44 is apertured and provided with a suitable bushing 51 through which the wires are passed from the exterior of the casing. The head member 42 is preferably in the form of a cylindrical casting having a radial flange 53 to facilitate mounting the casing on the instrument board.

The head member casting 42 forms a light chamber 54 containing the lamp 25 and a second light chamber 56 housing the second lamp 28, the two chamber being separated by a partition 58. The light chambers 54 and 56 have openings in the face of the head member, which openings may be covered by windows 60 and 61 respectively. Preferably the window 60 has etched or otherwise marked thereon the word "Water" and the window 61 is similarly marked with the word "Land." Since a manually operable checking member in the form of a lever 63 is mounted on the face of the head member to swing toward either of the two windows 60 and 61, the face may be marked with an arcuate line 64 with arrow-shaped ends to indicate the directions of such movement from an intermediate neutral position.

The head member 42 is bored and tapped to receive the threaded ends of three rods 65 by means of which the mechanism within the casing 40 is supported from the head member. The three rods 65 engage the following members in the following order: spacer sleeves 68 adjacent the head member 42; a laminated switch block 69; a casing plate 70; spacer sleeves 71 abutting the casing plate 70; a second casing plate 72 abutting the ends of the spacer sleeves 71; a third set of spacer sleeves 73; a plate 74 abutting the spacer sleeves 73; and, finally, nuts 75 to hold the foregoing assembly together. The casing compartment 77 in the casing 40 defined by the casing plate 70 and the head member 42 is a switch compartment. The casing compartment 78 defined by the casing plates 70 and 72 houses the means for returning the switch arm 20 to neutral position. The clockworks for regulating the rate at which the switch arm 20 is returned to the neutral position is installed in the casing compartment 79 between the casing plates 72 and 74.

The checking lever 63 is secured by a pin 80 to the protruding end of a shaft 81 that extends through a suitable bore 82 in the partition 58 of the head member 42, the shaft being further journaled in bearings 83 and 84 in plates 70 and 72 respectively and being formed at its inner end with an annular flange 85 in abutment with the bearing 84 to prevent axial movement outwardly. The primary purpose of the shaft 81 is to control the switch arm 20 in the casing compartment 77.

The switch arm 20 secured on the shaft 81 by a pin 88 comprises a block 90 of insulating material and a pair of spaced parallel switch blades 91 and 92. Each of the switch blades is apertured to receive a pair of screws 93 by which they are attached to the block 90, a small plate 94 of conducting material serving as a spacer between the two blades. The laminated switch block 69 with which the switch arm 20 cooperates includes two U-shaped insulating plates 95 and 96 of a configuration best shown in Fig. 5 and an intermediate U-shaped insulating plate 97. The intermediate plate 97 is separated from the two adjacent plates 95 and 96 of the switch block assembly by spacer sheets 98 of insulating material and is lesser in radial dimensions than the plates 95 and 96 to provide an arcuate recess 99 into which the two switch blades 91 and 92 extend. Within the arcuate recess 99 on the inner face of the insulating plate 95 are mounted the two previously mentioned contacts 23 and 26 in the form of strips of metal, the contacts being so positioned that the switch blade 91 lies against the contact 23 when the checking lever 63 is moved toward the window 60 marked "Water" and lies against the contact 26 when the checking lever is shifted toward the window 61 marked "Land." The contact 23 has a flanged portion 100 extending through an aperture 103 in the insulating plate 95 (Fig. 5) and the contact 26 has a similar flanged portion 104 extending through a second aperture 105 in the insulating plate 95, these two flanged portions being connected by the wires 24 and 27 respectively to the two corresponding lamps 25 and 28 in the light chambers.

Also within the arcuate recess 99 are the two previously mentioned contacts 29 and 30 mounted on the inner face of the insulating plate 96 for cooperation with the switch blade 92. These two contacts have flanged portions (not shown) similar to the flanged portions 100 and 104 extending through apertures (not shown) in the insulating plate 96 whereby the contacts 29 and 30 may be connected in the required circuits.

The circuits associated with the switch arm 20 are established through the previously mentioned plugs 47, 48, and 49. For this purpose we mount on the face of the plate 74 a bracket 110 carrying three jacks 111, 112, and 113 positioned to receive plugs 47, 48, and 49 respectively. The jack 111 is connected to a wire 116 (Fig. 5) that terminates at one of the screws 93 and is thereby electrically connected with the two switch blades 91 and 92. The jacks 112 and 113 are connected respectively with the contacts 29 and 30.

The actuating means for returning the switch arm 20 to its normal neutral position touching both contacts 29 and 30, and for simultaneously returning the checking lever 63 to its corresponding neutral position includes a plate assembly generally designated 119, comprising two plates 120 and 121 in the casing compartment 78. The two plates are connected together by a pair of screws 122 through a spacer block 123 (Fig. 7), by a stud 124 having threaded ends engaged by nuts 125, by a screw 126, and by a screw 128 extending through a spacer sleeve 129. The plate assembly 119 is mounted on a pair of links 130 and a second pair of links 131. Each of the links 130 is apertured at one end for rotatable mounting on the shaft 81 and is apertured at the other end to pivotally embrace the spacer sleeve 129 on the screw 128. The second pair of links 131 swings from a ratchet shaft 135 that extends through slots 136 and 137 in the plates 120 and 121 respectively, the two links being between the plates and on opposite sides of a ratchet wheel 138 that is keyed to the ratchet shaft 135. It is apparent that by virtue of the two pairs of links the plate assembly will be free to reciprocate and will be guided by the two pairs of links, the range of reciprocation being determined by the slots 136 and 137.

Movement of the plate assembly 119 in one direction of its range of reciprocation is accomplished through a rocker 140 that is secured to the shaft 81 by a pin 141, the rocker being mounted between the two links 130. One arm 142 of the rocker 140 carries a roller 143 positioned to press against a face of the spacer block 123 and the other arm 144 of the rocker is positioned to move against the spacer 129 on the screw 128 of the rocker assembly, the end of the arm 144 being recessed to conform with the periphery of the spacer 129. By virtue of this arrangement rotation of the shaft 81 in one direction will cause the arm 142 to move the plate assembly 119 away from the shaft, and rotation of the shaft 81 in the opposite direction will cause the arm 144 to move the plate assembly away from the shaft in the same manner.

To return the plate assembly toward the shaft 81 thereby to return the master lever 63 to its neutral position, we provide in the preferred form of our invention two helical springs 145, one on each side of the plate assembly. One end of each of the springs 145 may conveniently be connected to the corresponding nut 125 on the end of the stud 124. For anchoring the opposite ends of the two springs 145 we prefer to employ means that includes a relatively large pin 147 (Figs. 2 and 7) extending through the two casing plates 70 and 72, the pin being held against axial movement by a head 148 formed in one end and by a cotter key 149 extending through the other, and mounted on the pin 147 between the two casing plates 70 and 72 is a pair of arms 150 held in spaced relation by three spacer sleeves 151. Fixedly attached to each of these arms 150 is a nut 152 which receives the end of a suitable screw 153 extending from the adjacent casing plate 70 or 72. The two springs 145 are anchored to the nuts 152, the described arrangement serving to hold the nuts rigidly in position against the force of the springs.

To retard the spring-actuated movement of the plate assembly 119, we mount a pawl 155 on the screw 126 that both interconnects the links 131 and connects the links with the plate assembly. The two links 131 extend beyond the screw 126 and are interconnected at their outer ends by a pair of screws 156 extending through a spacer block 157. On this spacer block is mounted a suitable leaf-spring 158 that continuously urges the pawl 155 toward the periphery of the ratchet wheel 138 whereby the pawl may engage one of the teeth 159 of the ratchet wheel. Whenever rotation of the master lever 63 shifts the plate assembly 119 to the limit permitted by the slots 136 and 137 of the plate assembly the pawl 155 engages one of the ratchet teeth 159 whereby the spring-actuated return movement of the plate assembly necessarily rotates the ratchet wheel. Whatever retards movement of the ratchet wheel will correspondingly retard movement of the master lever 63 and the corresponding movement of the switch arm 20.

In the preferred form of our invention shown in the drawings the means for retarding the movement of the ratchet wheel 138 is the clock mechanism in the casing compartment 79, the clock mechanism being driven by the two springs 145 through the medium of the ratchet wheel. The ratchet wheel 138 is keyed to the ratchet shaft 135 and the ratchet shaft is rotatably mounted in bearings 160 and 161 in the two casing plates 70 and 72 respectively. The ratchet shaft 135 extends into the casing compartment 79 and has an axial bore in its end to receive the shaft 164 on which the first gear 165 of the clockworks is mounted, a setscrew 166 in the ratchet shaft extending into the bore into engagement with the gear shaft 164.

The clockworks is carried by the plate 74 and a spaced parallel plate 168 connected thereto by four studs 169. In the particular construction shown, the first gear 165 of the clock mechanism engages a pinion 171 on a shaft 172 that carries a second gear 173. The second gear in turn through a pinion 174 on a shaft 175 drives a third gear 176. Finally, the third gear engages a pinion 177 (Fig. 1) on a shaft 178 to which is keyed an escapement wheel 179. Rotation of the escapement wheel is controlled in the well known manner by a forked lever 180 and cooperating balance wheel 181 (Fig. 8).

Since the mechanism shown in Figs. 1 to 9 is a part of the previously explained system shown diagrammatically in Fig. 10, the operation thereof will be obvious from the above description. Normally the checking lever 63 will be in the neutral position shown in Fig. 3, the associated switch arm 20 being likewise in its neutral position. When the pilot throttles down for a landing, he will flip the checking lever upward or downward according to whether he is to land on water or land and the corresponding indicating lamp will be energized to illuminate either the word "Water" or the word "Land" on the face of the mechanism. If the warning signal continues after the checking lever has been shifted to one of its two checking positions, the pilot will be thereby warned to make the indicated correction in the disposition of his landing mechanism. If the clockworks causes the return movement of the checking lever to be delayed a matter of, say, two minutes, and the plane has not alighted within that time the warning horn and red lamp will again be energized but may be readily stopped by the operator again flipping the checking lever towards the required checking position.

In Fig. 11 we show diagrammatically how our system may be designed to respond to more than one device or member of the aircraft. For example, X and Y may represent two members or devices of the aircraft which should be in their upper positions for an operating situation represented by the lamp 25a and should be in their lower positions for an operating situation represented by the lamp 28a. The system shown in Fig. 11 is for the most part identical with the system shown in Fig. 10, corresponding numerals with the suffix "a" being employed to designate corresponding parts. It will be noted that the member X is operatively related to the two switches 33a and 34a in the same manner as the member L of Fig. 10 is related to the corresponding switches 33 and 34. A switch 185 is electrically connected in parallel with the switch 33a by a wire 186 and a similar switch 187 is placed in parallel with the switch 34a by a wire 188, and the member Y is adapted to open the switch 185 in its upper position and to open the switch 187 in its lower position. If the switch arm 20a in Fig. 11 is moved upward to energize the indicator lamp 25a, the warning signal means will be energized unless or until both of the members X and Y are in their upper positions to cut off both the switches 33a and 185. In like manner, both the members X and Y must be in their lower positions to cut off the warning signals when the indicator lamp 28a is energized by the switch arm 20a.

Figure 12:
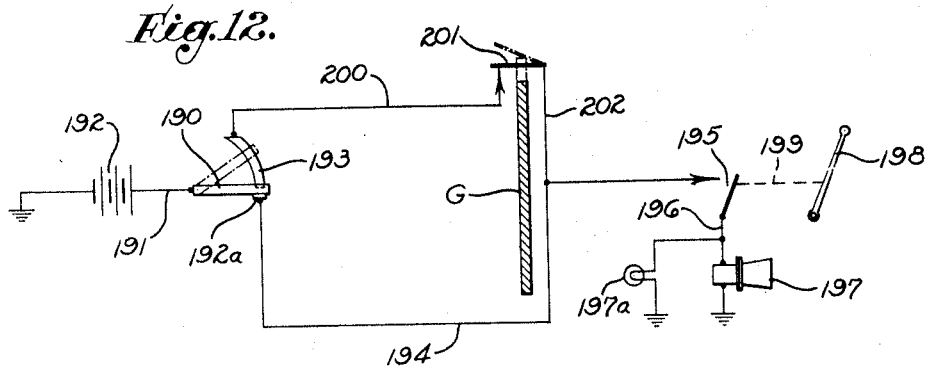
Fig. 12 is a diagram of a simplified form of our invention.

Fig. 12 shows diagrammatically how our invention in simplified form may be applied to the sole problem of insuring that a retractable landing gear of an aircraft be properly extended whenever the pilot reduces the power to glide to a landing. The switch arm 190 either constituting or connected to a checking lever is electrically connected by a wire 191 to a grounded battery 192. The switch arm 190 is adapted to take only two positions, the position shown in full lines at which it touches a contact 192a and the dotted line position at which it touches a contact 193, the switch arm being adapted in any suitable manner to avoid maintaining any intermediate position out of touch with either of the two contacts. The contact 192 is connected by a wire 194 to one side of a switch 195, the other side of the switch 195 being connected by a wire 196 to a grounded electrical horn 197. Here again a red lamp 197a may be placed in parallel with the horn 197 as an auxiliary warning means. The switch 195 is operatively connected to the throttle 198 through a suitable mechanical connection indicated by the dotted line 199 so that the switch 195 closes when the throttle 198 is moved towards its cut-off position. The contact 193 is electrically connected by a wire 200 to a switch 201 that is in turn connected to the switch 195 by a wire 202. Whenever the landing gear of the airplane is properly extended for a landing, the member G is in an upper position indicated in dotted lines at which upper position it holds open the switch 201.

In a system such as shown in Fig. 12, it is not necessary to have an indicator lamp energized to show the position of the switch arm 190, nor is it necessary to provide any delayed action means for moving the switch arm to either of its two positions. Whenever the pilot throttles down his motor, he thereby closes the switch 195. If the switch arm 190 is touching the contact 192 when the switch 195 is closed by the throttle, the alarm signal means will be energized to warn the pilot to shift the switch arm 190 to its upper or checking position whereupon the alarm signal will continue to be energized unless or until the landing gear is extended to cause the switch 201 to be opened. If no alarm signal at all results from closing the switch 195 by throttle movement, the absence of the signal will indicate that the switch arm 190 is already in checking position and that the landing gear is extended. Such would be the condition of the system if the pilot had neglected to retract his landing gear after taking off.

In the form of our invention indicated diagrammatically in Fig. 13, the same structure is employed as heretofore described with reference to Figs. 1 to 8. The elements of the diagram in Fig. 13 that are contained in the mechanism casing 40 on the instrument board of the aircraft are identical with corresponding elements of Fig. 10, corresponding numerals with the suffix "b" being employed to designate corresponding parts. It will be noted that the switch arm 20b cooperating with the contacts 23b, 26b, 29b, and 30b controls circuits through the two wires 31b and 32b leading from the casing, and also controls energization of the lamp 25b referring to landing on water and the lamp 28b referring to landing on land. The switch arm 20b in Fig. 13 is not directly connected with a battery 210 for energizing the system, but is in electrical communication with the battery through a grounded wire 211 attached to the switch arm and a second grounded wire 212 connected with one pole of the battery.

The wire 31b leads to a switch member 214 movable between an upper position touching a contact 215 and a lower position touching a contact 216, the switch arm being adapted to have a tendency when unopposed to move against the lower contact 216. In like manner the wire 32b leads to a second switch member 217 that is movable between an upper contact 218 and a lower contact 219, the switch member having an inherent tendency to move against the upper contact 218. The two contacts 215 and 219 are interconnected by a wire 220 and both are connected to one side of a green lamp 221 by a wire 222, the other side of the lamp being connected to the battery 210 by a wire 223. The two contacts 216 and 218 are interconnected by a wire 225 and by the same wire are connected to a second wire 226. The wire 226 is connected to one terminal of a red lamp 227 and has a branch wire 228 leading to a switch arm 230 that is mechanically connected to the throttle lever 231 of the aircraft through mechanical means indicated by the dotted line 232. The switch arm 230 cooperates with a contact 233 that is connected by a wire 234 with one terminal of an electric horn 235. From the battery 210 a wire 236 branches to connect with the second terminal of the red lamp 227 and with the second terminal of the horn 235.

Figure 13:
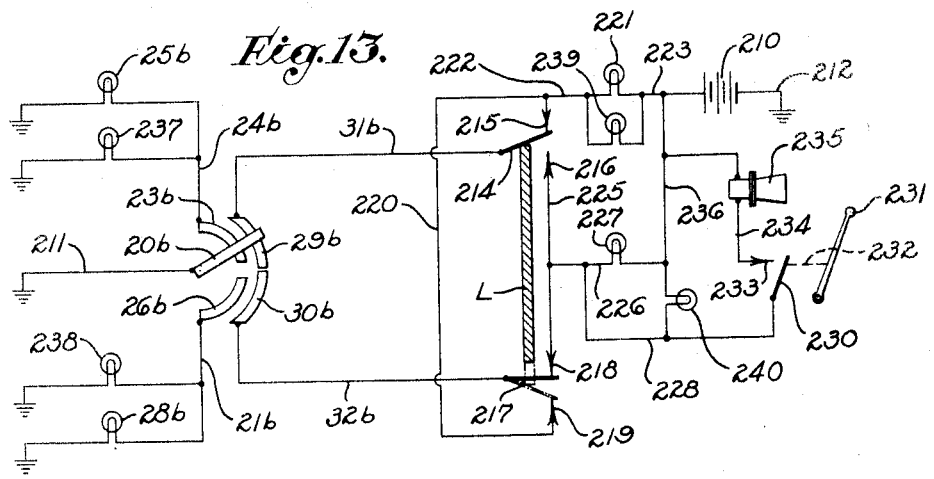
Fig. 13 is a diagram of another form of our invention.

The member L of Fig. 13, as previously mentioned with reference to Fig. 10, is operatively associated with the landing gear mechanism of the aircraft and is movable between an upper and a lower position in accordance with retraction or extension of the landing gear. In the upper position of the member L shown in full lines in Fig. 13 the switch member 214 is forced against the contact 215, but the lower switch member 217 is free to follow its inherent tendency to abut the contact 218. In the lower position of the member L indicated by dotted lines in Fig. 13, the upper switch member 214 is free to swing against the contact 216, but the lower switch member 217 is at such time forced away from the contact 218 and against the contact 219.

Fig. 13 shows the disposition of the switch arm 20b just after it has been flipped upward by the pilot for a checking operation preliminary to a landing on water. The lamp 25b is energized through the contact 23b to illuminate the word "Water" on the instrument panel and the switch arm also touches the contact 29b to connect the wire 31b to ground. The landing gear of the aircraft being properly retracted for alighting on water, the member L is holding the switch member 214 against the contact 215 thereby completing a circuit for energizing the green lamp 221. The lower switch member 217 is against the contact 218 but neither the red lamp 227 nor the warning horn 235 is energized since the switch arm 20b is spaced from the contact 30b. It is apparent that the energization of the green light 221 indicates that the landing gear is in proper disposition for the operating situation that is represented by the energization of the lamp 25b. If the landing gear were not properly disposed for the maneuver in prospect as represented by energization of the lamp 25b, the switch member 214 would lie against the contact 216 to complete a circuit for energizing the red lamp 227 and the warning horn 235. Since the red lamp 227 has a direct connection with the battery 210 it would be energized whenever both the switch arm 20b lies against the contact 29b and simultaneously the switch member 214 lies against the contact 216, but energization of the warning horn 235 requires in addition the closing of the switch 230 in response to movement of the throttle 231 in the direction to reduce power. If the landing gear is not properly disposed for alighting on water, the lamp 227 will therefore give advanced warning from the moment the switch arm 20b is flipped upward, and if the disposition of the landing gear is not changed the warning horn 235 will subsequently come into operation when the pilot attempts to glide with reduced power.

For a checking operation prior to making a landing on ground, the pilot will shift the switch arm 20b to its lower position to energize the lamp 28b that illuminates the word "Land" on the instrument board. If the landing gear in such a situation is properly extended, the switch member 217 will be held against the contact member 219 by the member L to complete a circuit through the green lamp 221, but the fact that the switch member 214 will at the same time lie against the contact 216 will not cause energization of either the red lamp 227 or the horn 235 because the switch arm 20b is spaced from the contact 29b. On the other hand, if the member L is not in the position required for the operating situation that is represented by energization of the lamp 28b, the switch member 214 will lie against the contact 215 without energizing the green lamp 221, but the switch member 217 will lie against the contact 218 to energize the red lamp 227 and subsequently to energize the warning horn 235 upon leftward movement of the throttle 231.

Whether the aircraft is to be set down on land or water, movement of the checking member that controls the switch arm 20b will cause energization of the green lamp 221 if the landing gear is in the proper disposition. It may be noted, however, that if the intended maneuver is not completed within the interval of operation provided by the clockworks that regulates the return movement of the switch arm 20b, the switch arm 20b will in the course of the maneuver reach its neutral position to touch the contact 30b whereupon both the green and red lamps will be energized simultaneously and the horn will also be energized if the aircraft power plant is throttled down. In such case the pilot may cut off the red light and the horn merely by again shifting the checking member in the direction corresponding to the maneuver that is being performed.

In the course of normal flight, both the red lamp and the green lamp will be energized because the normal position of the switch arm 20b is at neutral touching both of the contacts 29b and 30b. As far as the instrument board is concerned, then, the purpose of the pilot in manipulating the checking member that controls the switch arm 20b is to put out the red light 227, leaving only the green light 221 energized. To put out the red light, he must manipulate the checking member to energize either the lamp 25b or the lamp 28b according to whether he intends to alight on water or land. Should the pilot neglect to employ the checking system of Fig. 13, he will be reminded of that fact as soon as he shuts off power to glide, since leftward movement of the throttle 231 will close the circuit through the warning horn 235. At such a time, the horn may be de-energized only by placing the landing gear in the proper disposition and manipulating the checking member to check that disposition.

Since it may be desirable in some installations to have the checking system of Fig. 13 under the observation of a co-pilot or other member of the crew at a second station on the ship, we show in Fig. 13 a lamp 237 in parallel with the lamp 25b, a lamp 238 in parallel with the lamp 28b, a lamp 239 in parallel with the lamp 221, and a lamp 240 in parallel with the lamp 227, these four auxiliary lamps being located at the second station on the aircraft, the first two lamps being suitably designated "Water" and "Land" respectively, and the latter two lamps being green and red respectively.

The diagrams and specific embodiments chosen for the purpose of disclosure and to illustrate the principles involved will suggest to those skilled in the art various changes, modifications, and substitutions that do not depart from our basic conception. We specifically reserve the right to all such changes, modifications, and departures that properly come within the scope of our appended claims.

We claim as our invention:

1. In an aircraft, means to check the disposition of an aircraft member that is movable into and out of a given position for a given operating situation, said checking means including: a checking member movable between a first position normal for flight and a second position, said second position representing said operating situation for the purpose of checking the disposition of said aircraft member; means on the aircraft adapted to take a position characterizing said given operating situation when said operating situation arises; means responsive to said checking member and said aircraft means to give a signal when said checking member is in said first position and said aircraft means is in said characteristic position, said signal being a reminder that said checking member should be moved to said second position for checking the disposition of said aircraft member for said operating situation; and means responsive to said aircraft member, to said checking member, and to said aircraft means to give a warning signal when said aircraft member is out of said given position while said checking member is in said second position and while said aircraft means is in said characteristic position.

2. In an aircraft, means to check the disposition of an aircraft member that is movable between a first position required for a first operating situation and a second position required for a second operating situation, said checking means including: a checking member adapted to be moved by the aircraft operator from a neutral position either to a first checking position representing said first operating situation or to a second checking position representing said second operating situation; a first indicator circuit representing said first operating situation; a switch in said circuit responsive to said aircraft member to open when said aircraft member is in its first position and to close when said aircraft member is in its second position; a second switch in said circuit operatively connected with said checking member, said second switch being adapted to close when said checking member is in either said neutral position or said first checking position and to open when said checking member is in said second checking position; a second indicator circuit representing said second operating situation; a switch in said second circuit responsive to said aircraft member to open when said aircraft member is in its second position and to close when said aircraft member is in its first position; a second switch in said second circuit operatively connected with said checking member, said second switch in said second circuit being adapted to close when said checking member is at either said neutral position or said second checking position and to open when said checking member is at said first checking position; a third switch in each of said two circuits in series with the other recited switches of said circuits, said third switch being responsive to a flight-control member of the aircraft and being adapted to close whenever said flight-control member is moved to a position characterizing both said operating situations; and signal means responsive to closing of either of said circuits whereby a reminding signal will be given whenever said flight-control member is moved to said characteristic position while said checking member is in said neutral position and whereby a warning signal will be given whenever said flight-control member is at said characterizing position and simultaneously said checking member is at one of said checking positions and said aircraft member is out of the position corresponding to the operating situation represented by the position of said checking member.

3. A checking means as set forth in claim 1 that includes delayed-action means to move said checking member automatically from said second position to said normal first position.

4. A checking means as set forth in claim 1 that includes an additional signal means responsive to said checking member to indicate when the checking member is in at least one of its two positions whereby a co-pilot may be informed of changes in the disposition of the checking member made by the pilot.

HOWARD R. HUGHES.
STANLEY A. BELL.